(12) United States Patent  
Senan et al.

(10) Patent No.: US 9,177,273 B2  
(45) Date of Patent: Nov. 3, 2015

(54) FRAMEWORK FOR DEVELOPING ENTERPRISE SERVICE ARCHITECTURE

(75) Inventors: Sunil Senan, Bangalore (IN); Ramachandran Kallankara, Bangalore (IN); Rakesh Mishra, Kanpur (IN); Satadal Bandyopadhyay, West Bengal (IN); Vittal Shenoy, Bangalore (IN)

(73) Assignee: Infosys Limited, Bangalore (IN)

( * ) Notice: Subject to any disclaimer, the term of this patent is extended or adjusted under 35 U.S.C. 154(b) by 1038 days.

(21) Appl. No.: 12/464,448

(22) Filed: May 12, 2009

(65) Prior Publication Data

US 2010/0293023 A1      Nov. 18, 2010

(51) Int. Cl.
*G06F 7/00* (2006.01)
*G06Q 10/06* (2012.01)
*G06F 17/30* (2006.01)

(52) U.S. Cl.
CPC .......... *G06Q 10/06* (2013.01); *G06F 17/30607* (2013.01); *G06Q 10/0631* (2013.01)

(58) Field of Classification Search
CPC ................................................ G06F 17/30607
USPC ................... 705/7.11; 707/792, 944; 709/236
See application file for complete search history.

(56) References Cited

U.S. PATENT DOCUMENTS

2004/0143470 A1*  7/2004  Myrick et al. ..................... 705/7
2006/0069717 A1*  3/2006  Mamou et al. ................ 709/203
2006/0200477 A1*  9/2006  Barrenechea ................. 707/100
2007/0043724 A1*  2/2007  Senan et al. ....................... 707/8
2008/0250115 A1*  10/2008  Iyer ............................... 709/207

FOREIGN PATENT DOCUMENTS

CH         2391/CHE/2006       11/2008
IN              200602391 I4  * 11/2008

OTHER PUBLICATIONS

:Microsoft Computer Dictionary, copyright 2005, p. 553.*

* cited by examiner

*Primary Examiner* — Hunter Wilder
(74) *Attorney, Agent, or Firm* — Klarquist Sparkman, LLP

(57) ABSTRACT

The invention provides a framework for developing the architecture of an enterprise information technology (IT) eco-system for an organization. The framework includes a business function appliance module, a core architecture appliance module, and a technology architecture appliance module. The business function appliance module provides one or more functionalities for the business processes of the information technology eco-system. The core architecture appliance module provides one or more functionalities for the deployment and integration of the one or more functionalities provided by business function appliance module across IT processes, based on metadata configuration. The technology architecture appliance module is configured to provide technical operational services for the one or more functionalities provided by the core architecture appliance module based on the metadata. The framework, therefore, provides a metadata-based architecture that enables the business configuration to be defined, stored and managed as an independent layer.

16 Claims, 4 Drawing Sheets

FRAMEWORK FOR DEVELOPING ENTERPRISE SERVICE ARCHITECTURE

BACKGROUND

The invention relates generally to the enterprise management. More specifically, the invention relates to a framework for developing an enterprise information technology (IT) eco-system for an organization.

The enterprise information technology (IT) eco-system includes IT infrastructure and capabilities for development, implementation, support or management of the information technology infrastructure of an organization. The enterprise IT eco-system includes business structure and people that are integrated with the IT based automation of the business processes. The enterprise architecture principles, structures and related configuration metadata are hardwired into system implementation. The enterprise architecture as it exists in the organizations involves deployment of individual information technology projects. Thus, the enterprise architecture is created by the combination of various initiatives that have isolated characteristics.

Currently, enterprise architecture mainly exists on paper. Different parts of the infrastructure are deployed in a fragmented and inconsistent manner in organization. Moreover, the enterprise architecture does not offer solutions that deliver 'run-time' enterprise architecture capabilities. Changes in large enterprise architecture transformation initiatives occur frequently due to ineffective implementation of strategies. Further, due to the metadata being hardwired into system implementation, the architecture structure is re-invented and re-attached whenever the existing systems are disrupted through a business, operation and technology change. The current approach toward development of enterprise architecture and the application delivery strategy results in organizations having short cycles of large investments to keep the enterprise systems delivering business requirements. Although, metadata as a concept is being used in system designs, however, it is mostly for the internal consumption of technology products/packages. This results into lack of an integrated meta-data framework that can drive the entire information technology architecture automation.

In light of the foregoing, there is a need for an improved framework for development of an architecture that is adaptive to technologies, IT initiatives and change imperatives. The framework needs to be able to deploy enterprise architecture elements in shorter timeframes to meet the rapid business innovation cycles in an organization. Further, the framework should be able to switch technologies without disrupting the IT eco-system or the business down-time.

SUMMARY

An object of the invention is to provide a framework for developing the architecture of an enterprise information technology (IT) eco-system of an organization.

Another object of the invention is to provide a framework that deploys the architecture of an enterprise IT eco-system based on metadata configuration, thereby enabling the separation of the business configuration of the organization from its product configuration.

Yet another object of the invention is to provide a framework that is able to switch technologies without disrupting the IT ecosystem of an organization.

To achieve the objectives mentioned above, the invention provides a framework for developing the architecture of an enterprise IT eco-system for an organization. The framework includes a business function appliance module, a core architecture appliance module, and a technology architecture appliance module. The business function appliance module provides one or more functionalities for business processes of the enterprise IT eco-system. The core architecture appliance module provides one or more functionalities for deployment and integration of the one or more functionalities provided by the business function appliance module across one or more information technology processes.

The core architecture appliance module includes a metadata appliance module, a master data appliance module, a business process appliance module, a business rules appliance module and a docking module. The metadata module provides metadata to define the business configuration of the enterprise IT eco-system of the organization. The master data appliance module provides data management services to the one or more functionalities provided by the business function appliance module. The business process appliance module provides one or more business process templates for the one or more functionalities provided by the business function appliance module. The business rules appliance module provides business decision automation services to the one or more functionalities provided by the business function appliance module. The docking module enables integration of the one or more functionalities provided by the business function appliance module with the one or more functionalities provided by the core architecture appliance module based on the metadata.

The technology architecture appliance module provides technical operational services for the one or more functionalities provided by the core architecture appliance module based on the metadata.

The framework described above provides a metadata-based architecture that enables business configuration to be defined, stored and managed as an independent layer. The meta-data based architecture, thereby, provides business and system meta-data management infrastructure. The management infrastructure controls the characteristic behavior of technology infrastructure such that the technology infrastructure becomes a 'run-time' execution engine. Thereby, the framework provides capability for switching technical infrastructure without reconfiguring business or systems characteristics of the organization. The framework enables organizations to plug-in additional business processes into the enterprise information technology eco-system. Further, the framework enables the organization to configure additional business solutions independent of technology architecture of the organization.

BRIEF DESCRIPTION OF THE DRAWINGS

Various embodiments of the invention will hereinafter be described in conjunction with the appended drawings, provided to illustrate and not to limit the invention, wherein like designations denote like elements, and in which.

DETAILED DESCRIPTION OF DRAWINGS

The invention provides a framework and a computer program product for developing the enterprise information technology (IT) eco-system of an organization. The framework provides three layers of one or more business function appliances, one or more core function appliances and one or more technology architecture appliances. The business function appliances provide one or more functionalities for the business processes of the enterprise IT eco-system. The core architecture appliances provide one or more functionalities for the deployment and integration of the one or more functionalities of the business function appliances. The core architecture appliances include metadata that define the business configuration of the enterprise IT eco-system. Further, the core architecture appliances include a docking appliance for integrating the functionalities of the business function appliances with that of the functionalities of the core architecture appliances, based on the metadata.

Figure 1:
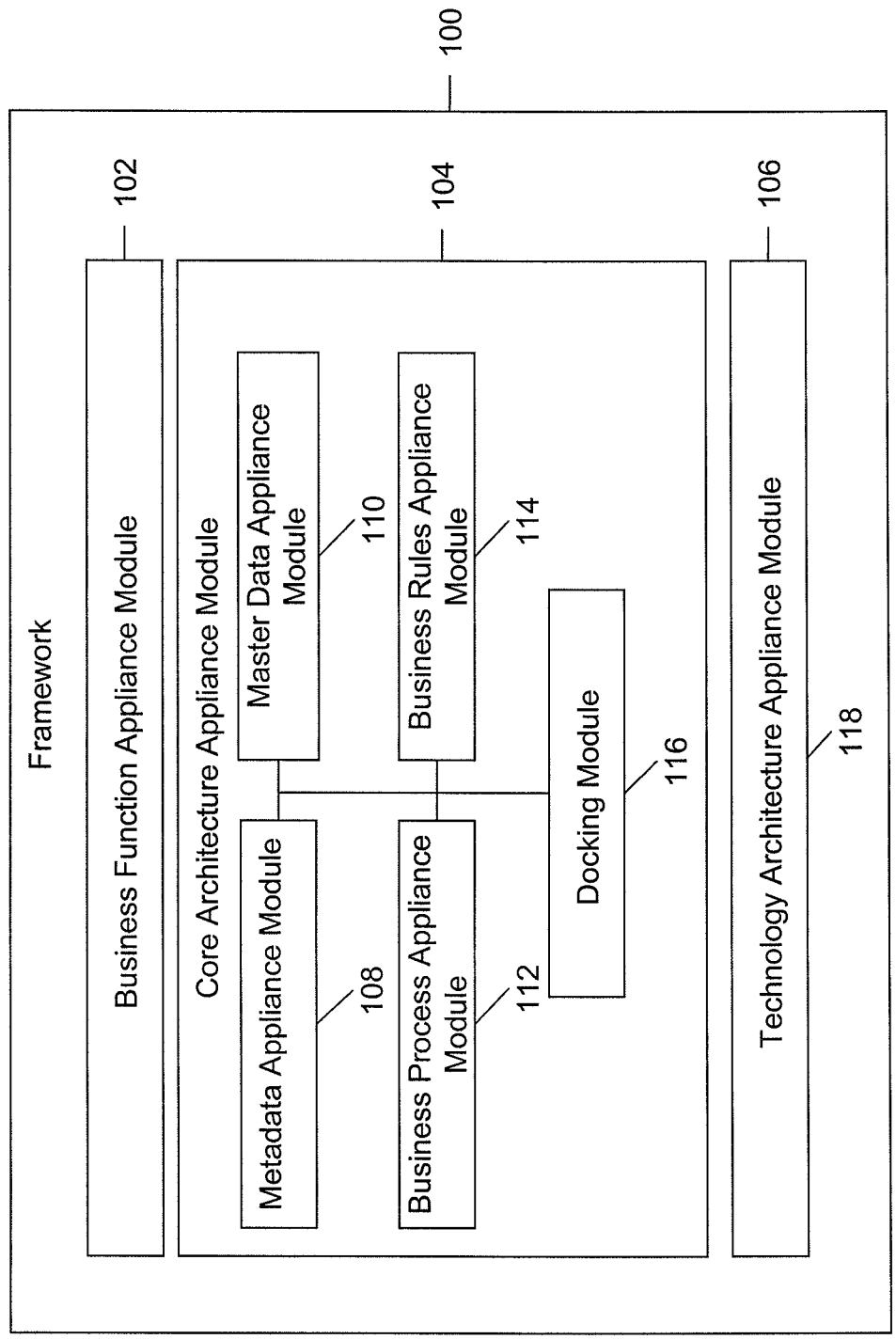
FIG. 1 is a block diagram of a framework for developing the architecture of an enterprise information technology (IT) eco-system, in accordance with an embodiment of the invention.

FIG. 1 is a block diagram of a framework 100 for developing the architecture of an enterprise IT eco-system of an organization, in accordance with an embodiment of the invention. Framework 100 provides one or more enterprise functionalities that are used across one or more business systems in the organization. Framework 100 includes a business function appliance module 102, a core architecture appliance module 104, and a technology architecture appliance module 106. The one or more enterprise functionalities in framework 100 are provided by business function appliance module 102, core architecture appliance module 104, and technology architecture appliance module 106. Core architecture appliance module 104 includes a metadata appliance module 108, a master data appliance module 110, a business process appliance module 112, a business rules appliance module 114 and a docking module 116. In various embodiments of the present invention, business function appliance module 102, core architecture appliance module 104, and technology architecture appliance module 106 are three layers that can be wired together to develop the architecture of an enterprise information technology information eco-system of the organization.

Business function appliance module 102 provides one or more functionalities for the business processes of an enterprise IT eco-system. The one or more functionalities include an Enterprise Resource Planning (ERP) application, a Supply Chain Management (SCM) application, a Business Intelligence (BI) application and the like. The details of business function appliance module 102 are described in conjunction with FIG. 3. Core architecture appliance module 104 provides one or more functionalities for the deployment and integration of the functionalities provided by business function appliance module 102 across IT processes.

Core architecture appliance module 104 provides automation functionalities across the layers of information processes and the enterprise IT eco-system. Core architecture appliance module 104 includes metadata appliance module 108, master data appliance module 110, business process appliance module 112, business rules appliance module 114 and docking module 116. Meta data appliance module 108 provides the metadata for defining business configuration of the enterprise IT eco-system of an organization. The metadata enables the enterprise IT eco-system to separate the business configuration of the organization from its product configuration. Further, metadata provided by metadata appliance module 108 includes two capabilities. First capability, related to the deployment of the architecture in the organization, enables porting of the business configuration on to the product configuration of the organization. The porting of the business configuration is achieved by providing a bridge between the product-independent business configuration and the product-specific business configuration of the organization. The product-independent business configuration of the organization is stored outside the 'run-time' environment' and the product-specific business configuration is stored inside 'run-time' environment. 'Run-time' environment refers to one or more executable and non-executable components of the information technology that are physically deployed into the production environment of the organization. Further, the 'run-time' environment implies that during execution of the business functions on the information technology infrastructure in this environment, the one or more executable and non-executable components may be part of the execution. The product-independent business configuration enables business users to define, store, change, manage and control the business configuration without impacting the production environment. Therefore, the business configuration of the organization resides into a storage repository that is not part of the production environment. In order to deploy the business configuration onto the enterprise IT eco-system, the business configuration is brought into the production run-time. This is achieved by a bridge feature of framework 100 that enables porting of the product-independent business configuration from storage repository into the product specific configurations. The bridge is provided using one or more data-migration utilities, such as FORMATICA™ and IBM Ascential™. One or more migration rules are built to map the product-independent business metadata on to product-specific metadata. By using the bridge, business analysts in the organization can manage the life-cycle of the product-independent business metadata. Thereafter, the IT analysts of the organization can convert the product-independent business metadata into product-specific metadata. However, manual configuration may not be required when the organization migrates from one product package to another. The second capability, related to run-time functionality, enables the storage of one or more common business configurations, such as one or more business rules, in the IT eco-system platform. Run-time functionality refers to a functionality that is available in the run-time environment of the IT eco-system. This functionality has fully functional capabilities that are deployed on the IT eco-system platform and can be connected to the one or more business systems of the organization. The one or more common business configurations are used by software application and other eco-system elements.

In various embodiments of the present invention, the metadata includes business process metadata, business rules metadata, business service metadata, business master metadata, and business information metadata. Business process metadata defines one or more characteristics of the business process flow of the organization. The one or more characteristics of the business process flow include constraints and controls that are independent of specific business process execution technology. Constraints of the business process flow govern decision making and validations during the execution. Controls of the business process flow govern the sequence of the execution. Business rules metadata defines one or more business rules specifications and context that are independent of execution technology. Business service metadata defines business service specifications, context and contract that are independent of specific business process execution technology. Specification describes one or more capabilities and characteristics of the business services. Context describes the environmental conditions for the business service. Contract defines agreement of the service outcomes for service consumers. Business master metadata defines the specifications of master business entities in a format that is independent of the physical storage technology being used during run-time. Business information metadata provides specifications of the common business entity structure and the semantics that are independent of specific business process execution technology. The common business entity structure describes the specific information that is included in the definition of the business entity. The entity semantics describe representation of information elements and one or more individual characteristics.

Further, master data appliance module 110, included in core architecture appliance module 104, provides data management services to the functionalities provided by business function appliance module 102. The data management services of master data appliance module 110 enables the framework to manage the movement of master data across one or more data repositories in the organization to maintain the currency, validity and integrity of the master data. For example, if enterprise has multiple data stores that have copy of a master data, every time the master data is changed, it must be synchronized across all the copies of the master data. Business process appliance module 112 provides one or more business templates for the one or more functionalities provided by business process appliance module 102. The one or more templates are end-to-end and externalized. End-to-end implies that one or more templates provide an integrated view of the business process, starting from the stage of initiation of the business process to the closure of the business process, identified by the last event that concludes a specific instance of the business transaction. Business rules appliance module 114 provides business decision automation services to the one or more functionalities provided by business process appliance module 102. The examples of the business decision automation services include selection of policy that applies to a specific customer based on the insurance package selected by the customer. Docking module 116 enables integration of the functionalities provided by business function appliance module 102 with the one or more functionalities provided by core architecture appliance module 104 based on the metadata. Docking module 116 also provides a first layer that facilitates the integration of the one or more functionalities provided by business function appliance module 102 and core architecture appliance module 104 into the IT eco-system based on the metadata. The first layer enables the access of business function appliance module 102 and core architecture appliance module 104 to the IT eco-system of the organization. In various embodiments of the present invention, metadata based integration enables the use of the services by business function appliance module 102 and core architecture appliance module 104, without customization and coding. Further, docking module 116 provides a second layer that converts enterprise eco-system specific events/configurations to business application specific events/configurations and vice-versa. Thus, when the organizations migrate from one product-specific configuration to other product-specific configuration due to technology or product change, the second layer is modified for the product to provide the changed product-specific configuration. The first layer is not modified as the first layer is designed to be independent of the product/technology specific configuration.

Docking module 116 provides an integration unit for decoupling business function appliance module 102, core architecture appliance module 104, and technology architecture appliance module 106. During the packaging of the one or more functionalities provided by the three layers, one or more service points are defined to control the configurability of the characteristics of the three layers. The three layers are not integrated to each other in a point-to-point manner to avoid tight coupling. Instead, the layers are integrated in accordance with the metadata which provides information interoperability, mobility and service virtualization to enable docking-based systemic integration of business function appliance module 102, core architecture appliance module 104, and technology architecture appliance module 106 across the three layers. Thus, docking-based systemic integration provides flexibility for modification of the configuration of appliance integration across organizations. Business function appliance module 102 and core architecture appliance module 104 utilize the technical operational services provided by technology architecture appliance module 106. Technology architecture appliance module 106 provides technical operational services to the one or more functionalities provided by core architecture appliance module 104. The details of technology architecture appliance module 102 are described in conjunction with FIG. 4.

Figure 2:
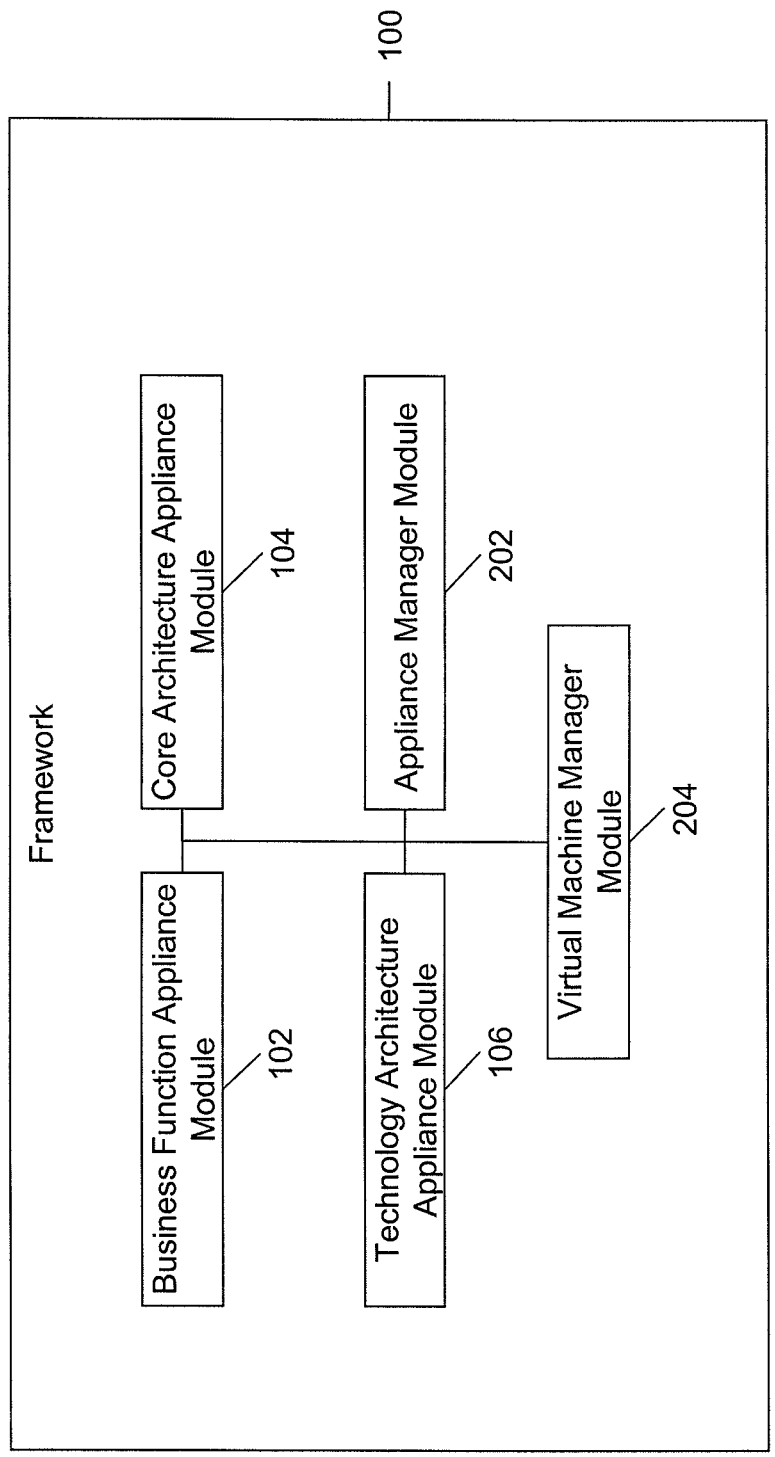
FIG. 2 is a block diagram of a framework for developing an enterprise IT eco-system, in accordance with another embodiment of the invention.

FIG. 2 is a block diagram of framework 100 for developing an architecture for the enterprise architecture IT technology eco-system, in accordance with another embodiment of the invention. According to the embodiment, framework 100 includes business function appliance module 102, core architecture appliance module 104, technology architecture appliance module 106, an appliance manager module 202 and a virtual machine manager module 204.

Business function appliance module 102, core architecture appliance module 104, and technology architecture appliance module 106 are described in conjunction with FIG. 1. Appliance manager module 202 monitors the performance of the one or more functionalities provided by business function appliance module 102, core architecture appliance module 104, and technology architecture appliance module 106. Further, appliance manager module 202 provides performance management of the one or more functionalities provided by business function appliance module 102, core architecture appliance module 104, and technology architecture appliance module 106. Furthermore, appliance manager module 202 acquires learning from the changes in the IT eco-system of the organization. Appliance manager module 202 includes a system knowledge management service that enables registering, reporting and managing the metadata information related to business function appliance module 102, core architecture appliance module 104, technology architecture appliance module 106 and the IT eco-system. The system knowledge management service enables availability of real-time information related to the IT eco-system.

Virtual machine manager module 204 provides a virtual platform for hosting the one or more functionalities provided by business function appliance module 102, core architecture appliance module 104, and technology architecture appliance module 106. This virtual hosting enables decoupling of the three layers and one or more components of physical infrastructure of the organization. The examples of the components of physical infrastructure of the organization include operating system, hardware and network. The components of the physical infrastructure are converted into services through one or more virtual interfaces. The one or more virtual interfaces are assigned to a plurality of applications without the need for physical hardwiring during deployment of the plurality of applications. The one or more virtual interfaces are logical representation of services provided by the physical infrastructure. The logical representation provides decoupling between service consumer and the physical infrastructure. Logical representation can be mapped to any desired physical component of the physical infrastructure without the need of any change in the binding between service consumer and logical representation. Thus, the virtual hosting enables a solution developer to use the virtual view of the components of the physical infrastructure of the organization for the deployment of the three layers.

Figure 3:
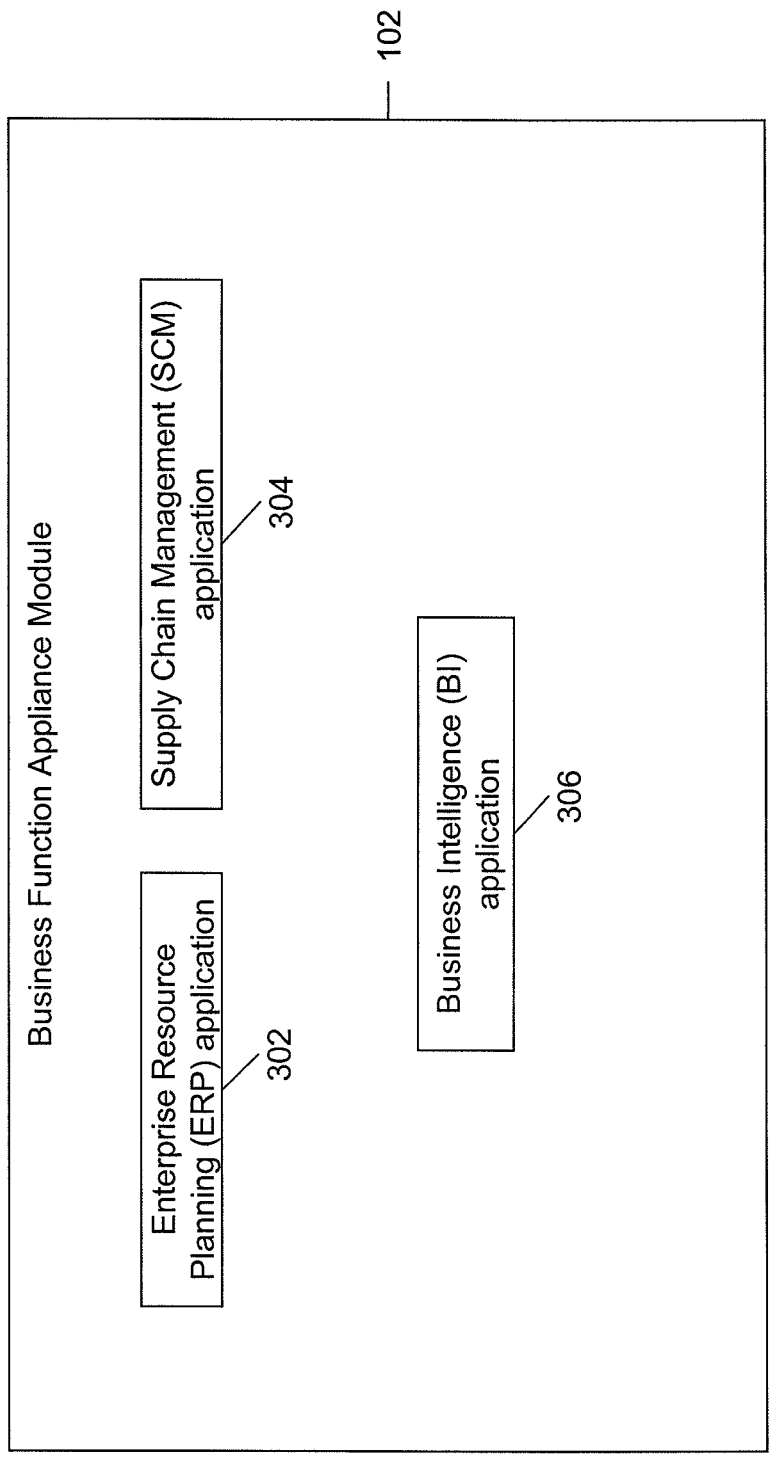
FIG. 3 is a block diagram of a business function appliance module, in accordance with an embodiment of the invention.

FIG. 3 is a block diagram of business function appliance module 102, in accordance with an embodiment of the invention. Business function appliance module 102 includes an Enterprise Resource Planning (ERP) application 302, a Supply Chain Management (SCM) application 304, and a Business Intelligence (BI) application 306. ERP application 302 integrates data and one or more business processes of the organization into a unified system. ERP application 302 uses one or more components of software and hardware to achieve the integration. SCM application 304 controls and manages planning, implementing, and controlling the operations of the supply chain of the organization. BI application 306 provides technologies, applications, and practices for the collection, integration, analysis, and presentation of business information of the organization.

Figure 4:
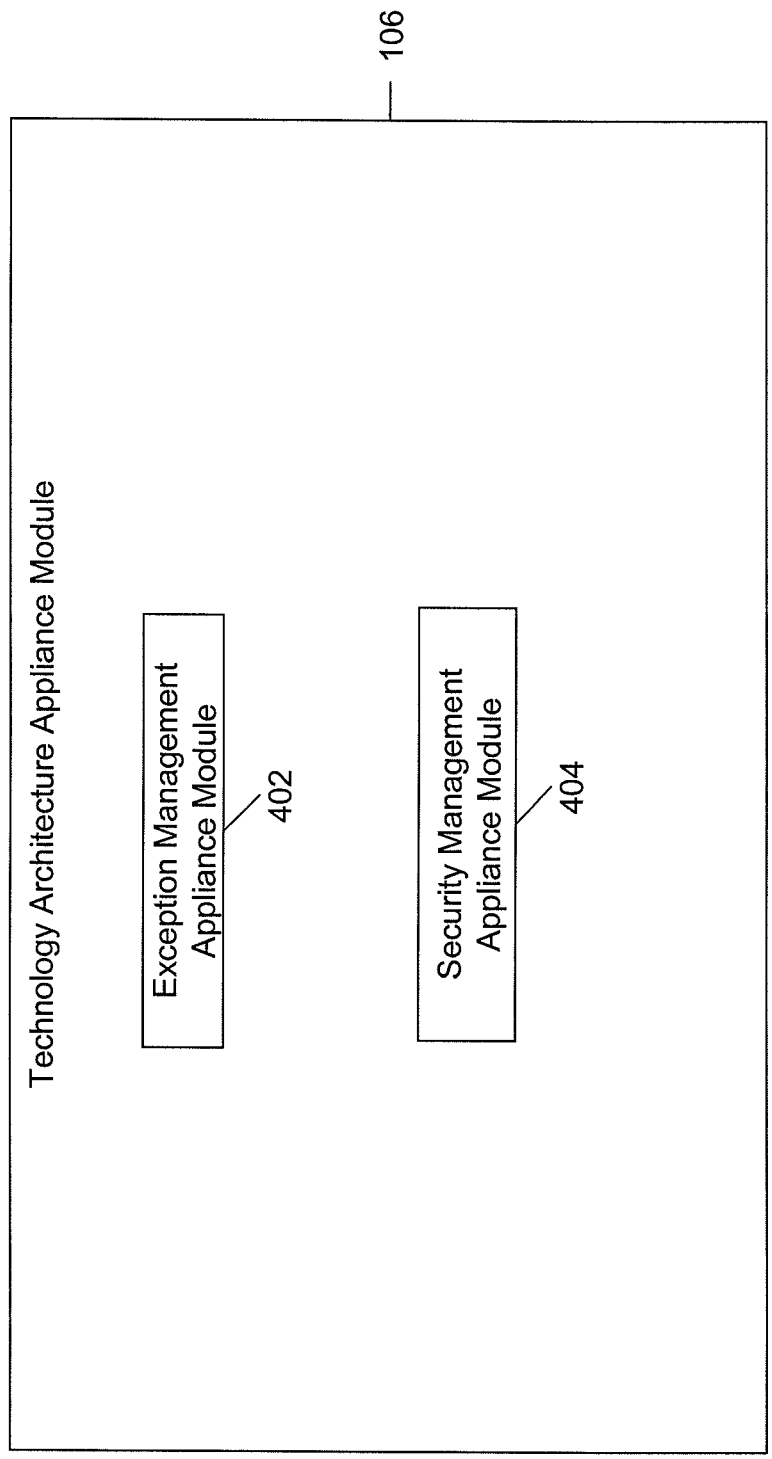
FIG. 4 is a block diagram of a technology architecture appliance module, in accordance with an embodiment of the invention.

FIG. 4 is a block diagram of technology architecture appliance module 108, in accordance with an embodiment of the invention. Technology architecture module 108 includes an exception management appliance module 402 and a security management appliance module 404. Exception management appliance module 402 provides central enterprise level exception processing functionality. Further, exception management appliance module 402 manages one or more exception events and exception process flows for the one or more business process flows that could have been deployed into business function appliance 102. Security management appliance module 404 provides one or more security services that can be configured for one or more components of the enterprise IT eco-system.

Framework 100 described above provides a metadata-based architecture that enables a business configuration to be defined, stored and managed as an independent layer. The meta-data based architecture, therefore, provides a business and system meta-data management infrastructure. The management infrastructure controls the characteristic behavior of technology infrastructure such that the technology infrastructure becomes a 'run-time' execution engine. Thus, framework 100 provides the capability of switching technical infrastructure without reconfiguring the business or systems characteristics of the organization. Framework 100 enables organizations to plug-in additional business processes into the enterprise information technology eco-system. Further, framework 100 enables the organization to configure additional business solutions independent of technology architecture of the organization.

In various embodiments of the invention, the modules of Framework 100 may be implemented in the form of software, hardware, firmware, or combinations thereof.

The computer system comprises a computer, an input device, a display unit and the Internet. The computer comprises a microprocessor, which is connected to a communication bus. The computer also includes a memory, which may be a Random Access Memory (RAM) or a Read Only Memory (ROM). Further, the computer system comprises a storage device, which can be a hard disk drive or a removable storage drive such as a floppy disk drive, an optical disk drive, etc. The storage device can be other similar means for loading computer programs or other instructions into the computer system. The computer system includes a communication unit, which enables the computer to connect to other databases and the Internet through an I/O interface. The communication unit enables the transfer and reception of data from other databases. The communication unit may include a modem, an Ethernet card or any similar device that enables the computer system to connect to databases and networks such as LAN, MAN, WAN and the Internet. The computer system facilitates inputs from a user through an input device that is accessible to the system through an I/O interface.

The computer system executes a set of instructions that is stored in one or more storage elements, to process input data. The storage elements may hold data or other information, as desired, and may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program, or a portion of a program module, as in the present invention. The software may also include modular programming in the form of object-oriented programming. Processing of input data by the processing machine may be in response to users' commands, the results of previous processing, or a request made by another processing machine.

While the preferred embodiments of the invention have been illustrated and described, it should be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. One or more non-transitory computer-readable media storing a framework for developing an architecture of an enterprise information technology eco-system for an organization, the framework comprising:

a. a business function appliance module configured to provide one or more functionalities for business processes of the enterprise information technology eco-system;
 b. a core architecture appliance module configured to provide one or more functionalities for deployment and integration of the one or more functionalities provided by the business function appliance module across one or more information technology processes, the core architecture appliance module comprising:
  i. a metadata appliance module configured to provide metadata for defining business configuration of the enterprise information technology eco-system, wherein the metadata provides a bridge between product-independent business configuration and product-specific business configuration and enables storage of one or more common business configurations;
  ii. a master data appliance module configured to provide data management services to the one or more functionalities provided by the business function appliance module;
  iii. a business process appliance module configured to provide one or more business process templates for the one or more functionalities provided by the business function appliance module;
  iv. a business rules appliance module configured to provide business decision automation services to the one or more functionalities provided by the business function appliance module; and v. a docking module configured to provide integration of the one or more functionalities provided by the business function appliance module with the one or more functionalities provided by the core architecture appliance module, based on the metadata;

c. a technology architecture appliance module configured to provide technical operational services for the one or more functionalities provided by the core architecture appliance module based on the metadata; and d. a virtual machine manager module configured to provide a virtual platform for hosting the one or more functionalities provided by the business function appliance module, the core architecture appliance module, and the technology architecture appliance module, wherein the business function appliance module, the core architecture appliance module, and the technology architecture appliance module serve as three respective layers, and the virtual platform for hosting decouples the three layers from one or more components of physical infrastructure of the organization, and the one or more components of the physical infrastructure are converted into respective services through one or more virtual interfaces, wherein the one or more virtual interfaces are logical representations of services provided by the physical infrastructure, and a particular logical representation is mappable to any of the physical components of the physical infrastructure without changing a binding between a service consumer and the particular logical representation.

2. The one or more non-transitory computer-readable media according to claim 1, wherein the framework further comprises an appliance manager module configured to provide monitoring of performance of the one or more functionalities provided by the business function appliance module, the core architecture appliance module, and the technology architecture appliance module.

3. The one or more non-transitory computer-readable media according to claim 2, wherein the appliance manager module is configured to provide performance management of the one or more functionalities provided by the business function appliance module, the core architecture appliance module, and the technology architecture appliance module.

4. The one or more non-transitory computer-readable media according to claim 2, wherein the appliance manager module is configured to acquire learning from changes in the enterprise information technology eco-system.

5. The one or more non-transitory computer-readable media according to claim 1, wherein the metadata comprises business process metadata for defining one or more characteristics of a business process flow of the organization, the one or more characteristics include constraints and controls for the business process flow that are independent of specific business process execution technology.

6. The one or more non-transitory computer-readable media according to claim 1, wherein the metadata comprises business rules metadata for defining one or more business rules specifications and one or more context, the one or more business rules specifications and the one or more context being independent of execution technology.

7. The one or more non-transitory computer-readable media according to claim 1, wherein the metadata comprises business service metadata for defining one or more business service specifications and contract, the one or more business service specifications and the contract being independent of implementation technology.

8. The one or more non-transitory computer-readable media according to claim 1, wherein the metadata comprises business master metadata for defining specification of master business entities in a predefined format, the predefined format being independent of physical storage technology being used during run-time.

9. The one or more non-transitory computer-readable media according to claim 1, wherein the metadata comprises business information metadata for providing specification of common business entity structure and semantics, the specification being independent of implementation technology.

10. The one or more non-transitory computer-readable media according to claim 1, wherein applications provided by the business function appliance module comprise an Enterprise Resource Planning (ERP) application, a Supply Chain Management (SCM) application and a Business Intelligence (BI) application.

11. The one or more non-transitory computer-readable media according to claim 1, wherein applications provided by the technology architecture appliance module comprise an exception management appliance module and a security management appliance module.

12. A computer program product in a non-transitory computer readable media storing a framework for developing an architecture of an enterprise information technology eco-system for an organization, the computer program product comprising:

a. executable program instructions for providing one or more functionalities for business processes of the enterprise information technology eco-system;

b. executable program instructions for providing one or more functionalities for deployment and integration of the one or more functionalities for business processes across one or more information technology processes, the executable program instructions for providing the one or more functionalities for deployment and integration comprising:

i. executable program instructions for providing metadata for defining business configuration of the enterprise information technology eco-system, wherein the metadata provides a bridge between product-independent business configuration and product-specific business configuration and enables storage of one or more common business configurations;

ii. executable program instructions for providing data management services to the one or more functionalities for business processes;

iii. executable program instructions for providing one or more business process templates for the one or more functionalities for business processes;

iv. executable program instructions for providing business decision automation services to the one or more functionalities for business processes; and v. executable program instructions for integrating the one or more functionalities for business processes with the one or more functionalities for deployment and integration, based on the metadata;

c. executable program instructions for providing technical operational services for the one or more functionalities for deployment and integration, based on the metadata;

d. executable program instructions for providing a virtual platform for hosting the one or more functionalities for business processes, the one or more functionalities for deployment and integration, and the technical operational services, wherein the one or more functionalities for business processes, the one or more functionalities for deployment and integration, and the technical operational services are provided as three respective layers, and the virtual platform for hosting decouples the three layers from one or more components of physical infrastructure of the organization, wherein the one or more components of the physical infrastructure are converted into respective services through one or more virtual interfaces that are logical representations of the services; and e. executable program instructions for mapping a particular logical representation to any of the physical components of the physical infrastructure without changing a binding between a service consumer and the particular logical representation.

13. The computer program product according to claim 12 further comprises executable program instructions for providing monitoring of performance of the one or more functionalities for business processes.

14. The computer program product according to claim 13 further comprises executable program instructions for providing performance management of the one or more functionalities for business processes.

15. The computer program product according to claim 13 further comprises executable program instructions for acquiring learning from changes in the enterprise information technology eco-system.

16. A method of implementing a framework for developing an architecture of an enterprise information technology eco-system for an organization, the method comprising:

in a computer system:
    providing a business function appliance module configured to provide one or more functionalities for business processes of the enterprise information technology eco-system;
    providing a core architecture appliance module configured to provide one or more functionalities for deployment and integration of the one or more functionalities provided by the business function appliance module across one or more information technology processes;
    providing by the core architecture appliance module a metadata appliance module configured to provide metadata for defining business configuration of the enterprise information technology eco-system, wherein the metadata provides a bridge between product-independent business configuration and product-specific business configuration and enables storage of one or more common business configurations;
    providing by the core architecture appliance module a master data appliance module configured to provide data management services to the one or more functionalities provided by the business function appliance module;
    providing by the core architecture appliance module a business process appliance module configured to provide one or more business process templates for the one or more functionalities provided by the business function appliance module;
    providing by the core architecture appliance module a business rules appliance module configured to provide business decision automation services to the one or more functionalities provided by the business function appliance module;
    providing by the core architecture appliance module a docking module configured to provide integration of the functionalities provided by the business function appliance module with the one or more functionalities provided by the core architecture appliance module, based on the metadata;
    providing a technology architecture appliance module configured to provide technical operational services for the one or more functionalities provided by the core architecture appliance module based on the metadata;
    providing a virtual machine manager module configured to provide a virtual platform for hosting the one or more functionalities provided by the business function appliance module, the core architecture appliance module, and the technology architecture appliance module, wherein the business function appliance module, the core architecture appliance module, and the technology architecture appliance module serve as three respective layers, and the hosting decouples the three layers from one or more components of the physical infrastructure comprising an operating system, hardware, and network, wherein the one or more components of the physical infrastructure are converted into respective services through one or more virtual interfaces that are logical representations of the services; and
    mapping a particular logical representation to any of the components of the physical infrastructure without changing a binding between a service consumer and the particular logical representation.

* * * * *